United States Patent [19]

Kazmierowicz

[11] 4,176,554
[45] Dec. 4, 1979

[54] METHOD AND APPARATUS FOR OBTAINING THE TEMPERATURE PROFILE OF A KILN

[76] Inventor: Casimir W. Kazmierowicz, 26546 Aracena Dr., Mission Viejo, Calif. 92675

[21] Appl. No.: 849,783

[22] Filed: Nov. 9, 1977

[51] Int. Cl.² .............................................. G01K 7/14
[52] U.S. Cl. ...................................... 73/341; 73/361; 136/222; 136/233; 432/32
[58] Field of Search ................................ 73/341, 361; 340/366 CA; 136/232, 233, 230, 222; 364/557; 432/32; 219/483; 236/1 B

[56] References Cited

U.S. PATENT DOCUMENTS

| | | | |
|---|---|---|---|
| 2,205,182 | 6/1940 | Whitten | 432/32 |
| 2,474,192 | 6/1949 | Schlesman | 73/341 |
| 2,780,097 | 2/1957 | McKinlay | 73/361 |
| 2,924,974 | 2/1960 | Dalglish | 73/341 |
| 3,120,758 | 2/1964 | Craddock et al. | 73/341 |
| 3,495,925 | 8/1969 | Goosey et al. | 73/361 |
| 3,867,204 | 2/1975 | Schley | 136/232 |
| 4,075,036 | 2/1978 | Lysikov | 136/230 |

*Primary Examiner*—S. Clement Swisher
*Attorney, Agent, or Firm*—Jackson, Jones & Price

[57] ABSTRACT

The invention provides an array of spaced thermocouples inserted into the kiln as a unit to provide the temperature profile of the kiln on a continuous basis. The output signals from the thermocouples are multiplexed and displayed on a CRT device. A horizontal line across the face of the CRT screen provides a temperature reference for the profile when a digital thermometer is driven with the horizontal line generating voltage. To reproduce a desired temperature profile, the invention provides a temperature profile synthesizer comprising a resistor-ladder network and a voltage source for simulating the small voltages developed by the temperature monitoring thermocouples in the array. By displaying the synthesized temperature profile on the CRT at the same time that the actual measured temperature profile is being displayed, the kiln can be more easily controlled to provide the desired synthesized profile. By packaging these ladder networks on an encapsulated circuit card, the circuit package represents a permanent record of a particular desired temperature profile. A control system is provided wherein a kiln is automatically controlled to stabilize at a certain desired temperature profile as defined by the resistance ladder network synthesizer. As each monitoring thermocouple is sequentially read, its value is compared with the reference for that point generated by the synthesizer. The relative value of the two signals determine whether a corresponding heating element in the kiln is turned on or off.

18 Claims, 10 Drawing Figures

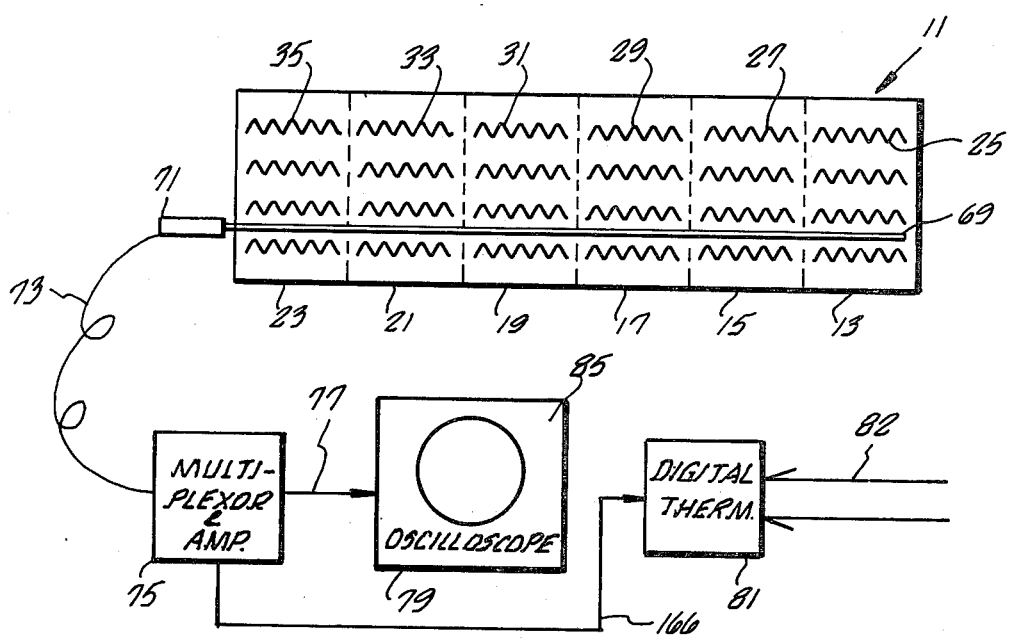
Fig_3_
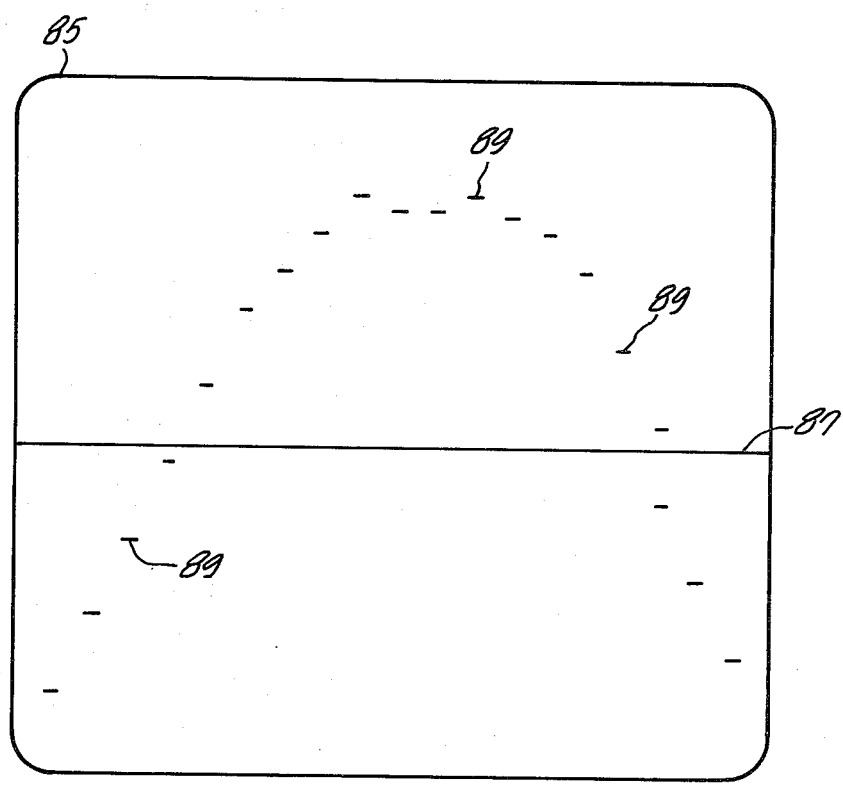
Fig_4_

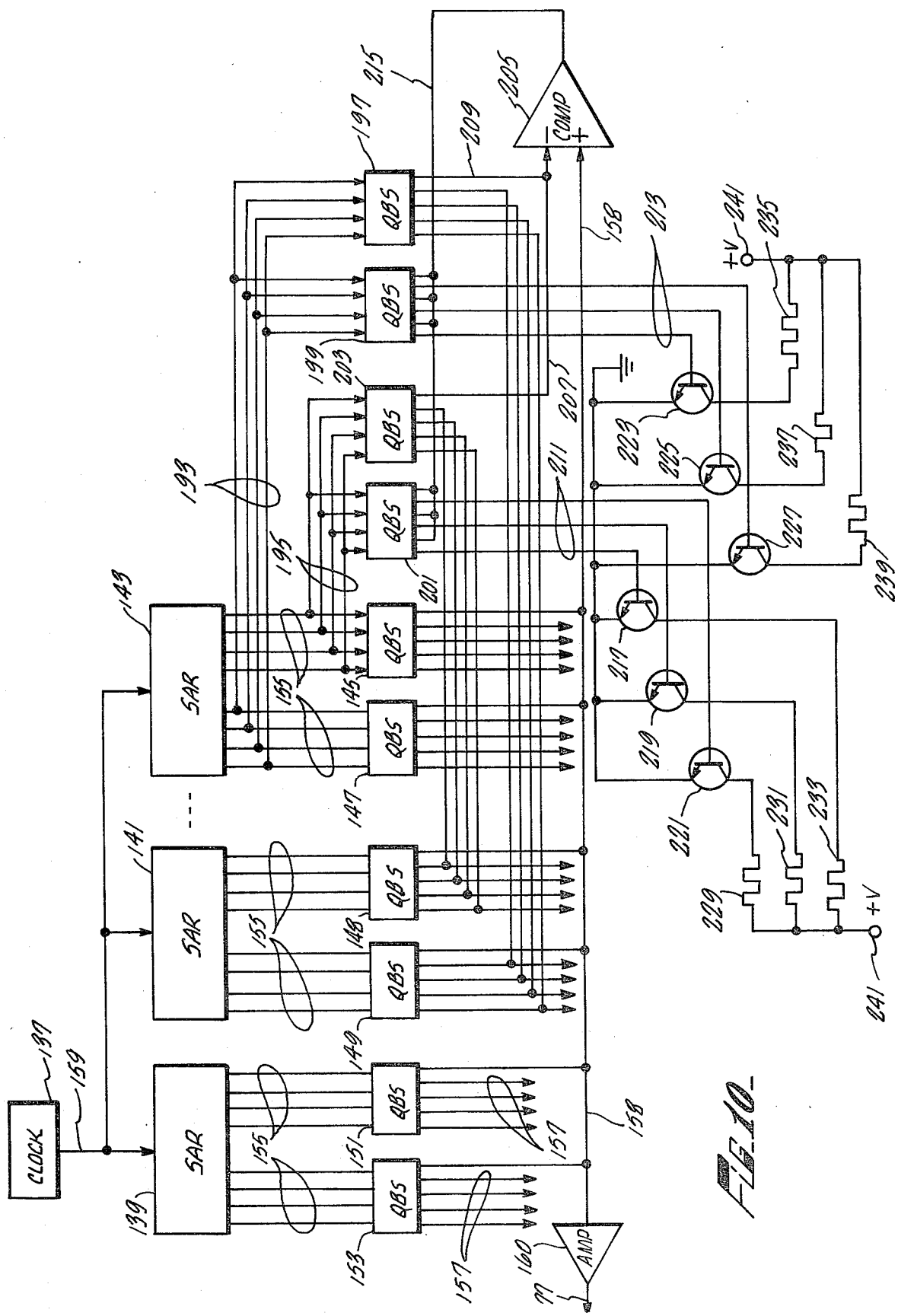

METHOD AND APPARATUS FOR OBTAINING THE TEMPERATURE PROFILE OF A KILN

BACKGROUND OF THE INVENTION

1. Field of the Invention

The present invention relates generally to improvements in kiln temperature adjustment and more particularly pertains to a new and improved method and system for obtaining the temperature profile of a kiln, storing and repeating that profile when desired.

2. Description of the Prior Art

The conventional means of determining the temperature profile of a kiln 11 (FIG. 1) consists of moving a thermocouple 53 through the kiln 11 and recording the temperature sensed by the thermocouple 53 on a strip chart 61 by means of a strip chart recorder 59 to which the thermocouple is connected by wires 57.

This particular method is utilized whether the kiln is a tunnel kiln in which the wares are stacked on a platform 55, for example, or a belt kiln in which the wares move through the tunnel at a specified rate on a conveyor belt, 55, for example. When a belt kiln is utilized, the thermocouple 53 is attached to the belt. If a tunnel kiln is utilized, thermocouple 53 must be pulled through the kiln by some other means, such as on a rod, for example.

A kiln is typically made up of a plurality of zones, 13, 15, 17, 19, 21, 23. Each zone may in turn be made up of a plurality of heating elements. The schematic illustration of the kiln of FIG. 1 illustrates a six zone kiln where the two end zones 13 and 23 are not monitored by controllers and the four middle zones 15, 17, 19 and 21 are monitored by controllers 43, 41, 39 and 37, respectively. Zone 1 controller 37 has a thermocouple 51 located somewhere in its zone 21 which provides the feedback signal to controller 37, telling it to increase or decrease the current supply to the heating elements 33 of its zone. Thermocouple 49 performs the same function for zone 2 controller 39. Thermocouple 47 performs the same function for zone 3 controller 41. Thermocouple 45 performs the same function for zone 4 controller 43. The heating element 25 of end zone 13 and the heating element 35 of end zone 23 are not controlled in this fashion but rather are controlled in an open loop manner.

Heating elements 25, 27, 29, 31, 33 and 35 of their respective zones 13, 15, 17, 19, 21 and 23 can be made up of a single heater unit such as manufactured by the Thermocraft Corporation, for example, or can be made up of a plurality of heater units. The size of the kiln, the number of heating elements and zones used, is determined by the wares and temperature profile to be achieved.

Once the kiln is stabilized, which could take as long as four hours, it is ready to have its temperature profile determined according to the prior art method shown in FIG. 1 by dragging a thermocouple 53 through it. The strip chart recorder 59 records the temperature in the kiln as a function of time as the thermocouple 53 enters the kiln and until it emerges from the exit zone. By knowing the chart speed of the recorder and the belt speed of the kiln, if it is a conveyor kiln or the speed at which it is pulled through, if it is a tunnel kiln, the temperature at any given location in the kiln can be determined.

The trace 67 produced by the strip chart recorder 59 is illustrated in FIG. 2 on strip chart 61. The trace 67 is the temperature profile of the kiln with the temperature 65 being along the Y axis and the distance 63 being along the X axis when the time axis of the strip chart recorder is converted into kiln position. Thus, from the trace 67, it can be seen that the maximum temperature of the kiln occurs at the center and the increase and decrease in temperature along the length of the kiln is shown by curve 67.

There are basically three main factors contributing to the temperature profile of the kiln. The first factor is the settings of the temperature controllers for each controlled zone in the kiln. That is, zones 15, 17, 19 and 21 of the FIG. 1 example. The second factor, which is present in conveyor-type belt kilns is the speed of the belt. Because the belt is relatively massive, its heat capacity causes heat from the entrance of the kiln to be shifted toward the exit as the belt moves through the kiln. If the controlled zones cannot respond rapidly enough to compensate for this redistribution of heat, the temperature at various points throughout the kiln will change causing the profile to also change. A third factor, which is present in all types of kilns is the mass of the ware itself. The ware has a certain heat capacity which will cause the profile of the kiln to change when inserted into the kiln. In a conveyor-type belt kiln, the ware causes the redistribution of heat in much the same way that the conveyor belt does.

In many applications it becomes extremely important that a certain preferred temperature profile be reproduced and maintained during firing of the ware, perhaps because only this profile produces the results desired. In such instances the profile of the kiln must be determined periodically during kiln use, because changes can and do occur in the temperature distribution within even a given zone. This is evident from the fact that each zone is controlled only by one feedback sensor such as a single thermocouple which is placed only at one point within the controlled zone. A change of temperature distribution just in one zone can change the entire temperature profile of the kiln.

The prior art method of moving a thermocouple through the kiln to provide a profile trace by strip chart recorder has a considerable amount of drawbacks, for example:

(1) each time a profile is to be obtained the actual generation of that profile consumes a significant amount of time, some profiles can take up to 12 hours. During the time that a kiln profile is being obtained, no change can be made in the control of the belt speed or current settings to the heating elements without invalidating the profile.

(2) the accuracy to which a particular given desired profile can be reproduced again and again is determined mostly by the skill of the operator, the number of controlled zones available in the kiln, their accuracy of control, and the amount of time available for obtaining a temperature profile.

The present invention does not have any of these drawbacks.

OBJECTS AND SUMMARY OF THE INVENTION

It is an object of this invention to provide a means and method for comparing the temperature at any given point in a kiln with any other given point.

It is a further object of this invention to provide a thermocouple assembly having an array of thermocouples therein for placement in a klin.

It is yet another object of this invention to provide a means and method for continuously monitoring and displaying the temperature profile of a kiln.

It is still a further object of this invention to provide a method and apparatus for providing for calibration of the temperature profile display.

It is still another object of this invention to provide a means and method of simultaneously displaying a synthesized temperature profile and an actual temperature profile, the synthesized temperature profile being a reference for the actual temperature profile of the kiln.

It is yet a further object of this invention to provide a permanent record of a desired temperature profile for a kiln which may be displayed when desired on a CRT. It is yet a further object of this invention to provide a means and method of controlling the temperature of a kiln in order to maintain a desired profile.

These objects and the general purpose of this invention are accomplished as follows. A unitary structure having an array of thermocouples therein is placed in the kiln which is to be monitored for its temperature profile. The signals from the thermocouple array are multiplexed and supplied through an instrumentation amplifier for display on the CRT of an oscilloscope. During the normal blanking time of the CRT display a horizontal line is generated across the face of the CRT which can be moved up and down by varying the voltage amplitude applied. This same horizontal line generating voltage is applied to a digital thermometer to provide a temperature indication for the horizontal line. Small voltages simulating thermocouple output voltages are reproduced by a resistance ladder network and a voltage source. By multiplexing the voltages generated by the ladder network during the same cycle that the voltage outputs from the thermocouple array are scanned, but on a second sweep trace, a simultaneous display of the kiln profile and a standard profile is obtained. When the kiln generated temperature profile merges with the synthesized temperature profile, the kiln contains the programmed profile. By packaging the resistance ladder network on a small circuit board, a particular profile represented by the resistance value of the network may be stored and recalled at will. Any desired kiln temperature profile may be created by varying the resistance values in the ladder network. A control system is provided wherein a kiln is automatically controlled to stabilize at a certain desired temperature profile as defined by the resistance ladder network synthesizer. As each monitoring thermocouple is sequentially read, its value is compared with the reference for that point generated by the synthesizer. The relative values of the two signals determine whether a corresponding heating element in the kiln is turned on or off.

BRIEF DESCRIPTION OF THE DRAWINGS

The exact nature of this invention as well as other objects and advantages thereof will become readily apparent upon consideration of the following specification related to the annexed drawings in which like reference numerals designate like parts throughout the figures thereof and wherein:

FIG. 3 is a block diagram illustration of a temperature profile obtaining system of the present invention.

FIG. 4 is a diagrammatic illustration of a display generated by the oscilloscope of FIG. 3.

FIG. 10 is a block diagram illustrating a kiln profile control system according to the present invention.

DESCRIPTION OF THE PREFERRED EMBODIMENTS

Figure 1:
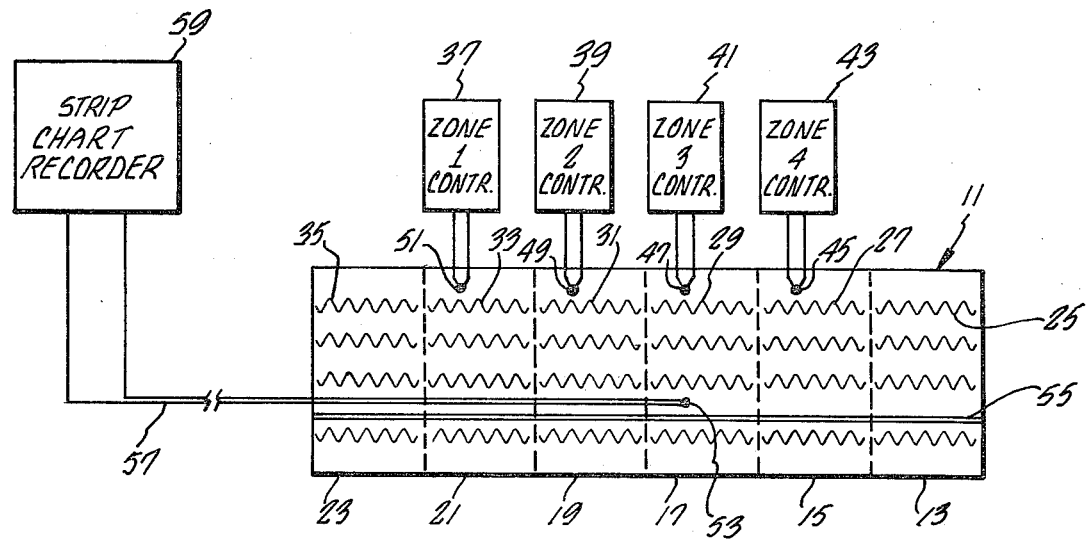
FIG. 1 is a schematic block diagram illustration of a prior art kiln.
Figure 2:
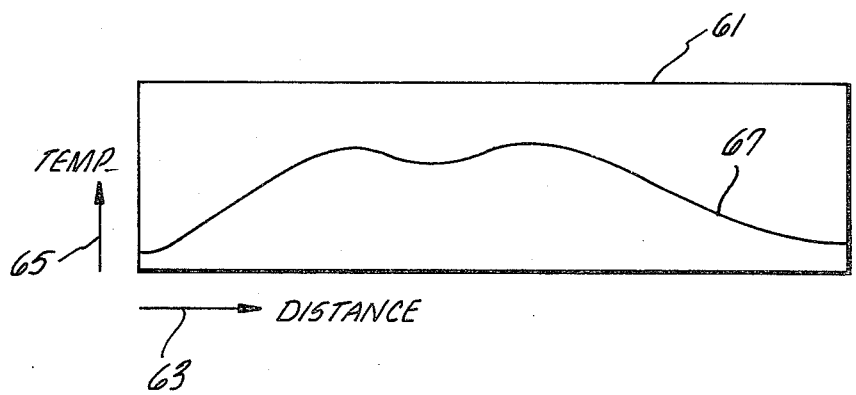
FIG. 2 is a diagrammatic illustration of a strip chart recording of a kiln temperature profile.

Reference is now made to FIG. 3, which illustrates the basic system and method according to the present invention for obtaining a temperature profile of a stabilized kiln 11. The basic elements of the invention are a thermocouple probe 69 which has therein a plurality of thermocouples dispersed along its length. The probe is connected to a multiplexer sampling and amplifying unit 75 which sequentially samples the output signals of the thermocouples in the probe 69 and amplifies them. The outputs are sequentially supplied to the Y-axis deflection plates of an oscilloscope 79 over cable 77.

The sweep rate of the oscilloscope is adjusted to that all the thermocouples in the probe 69 are scanned during one sweep cycle of the scope. The multiplexer 75 as will be more fully explained hereinafter switches from one thermocouple to another on a fixed time basis. By supplying the outputs of these thermocouples sequentially through an instrumentation amplifier to the Y axis deflection plates of the oscilloscope, they appear on the CRT screen 85 as short straight horizontal lines 89 having a vertical height that is determined by the temperature of the thermocouple junction that it represents.

The position of each short horizontal line 89 along the horizontal is determined by the position of its thermocouple junction relative to the other junctions, since the thermocouples are sampled sequentially from one end of the kiln to the other. The plurality of horizontal lines 89 on the screen outline the temperature profile of the kiln at the particular sampling time being displayed. The profile viewed on the CRT screen 85 is updated each sweep time of the oscilloscope 79. Consequentially changes in a temperature profile of the kiln 11 can be observed immediately as they occur and the effects of increasing or decreasing current supply to various heating elements in the various zones can be immediately ascertained.

Thermocouple scanning sequencers are known and being manufactured by the Omega Engineering Co., for example. The concept of sequentially scanning a series of thermocouples and displaying their sequential outputs on an oscilloscope screen has been utilized to analyze temperature changes occurring on a steel specimen during its hardening process. However, despite the need for a fast temperature profile system for kilns, the method and apparatus of FIG. 1 has been the most often used for this purpose.

Typically the return sweep of an oscilloscope 79 is blanked from the screen so it is not seen. The system of the present invention takes advantage of this by generating a horizontal line 87 across the screen during the time which would normally have been the blanking period. As will be more fully explained hereinafter, supplying a DC voltage at the beginning and end of one sweep cycle through the multiplexer 75 to the oscilloscope 79, a horizontal line 87 is generated during the normal blanking time. By varying the amplitude of this voltage, the line 87 may be moved up or down at will. By supplying this voltage over line 166 to a digital thermometer 81, which is calibrated to respond to the type of thermocouples utilized in the thermocouple probe 69, the horizontal line 87 appearing on the screen corresponds to the temperature reading generated by digital thermometer 81.

Digital thermocouple thermometers are quite well known in the art. A typical thermometer is made by the Omega Engineering Co. of Stamford, Connecticut.

By knowing the temperature represented by the horizontal line 87, any thermocouple reading represented by the individual horizontal dashes 89 can be determined simply by moving the horizontal line 87 up or down to coincide with the dash on which a temperature reading is desired. It will be remembered that the horizontal position of the dashes 89 across the CRT display 85 represents their position within the thermocouple probe 69 and the kiln 11. Therefore, the temperature at various points throughout the kiln can be determined in this manner.

Figure 5:
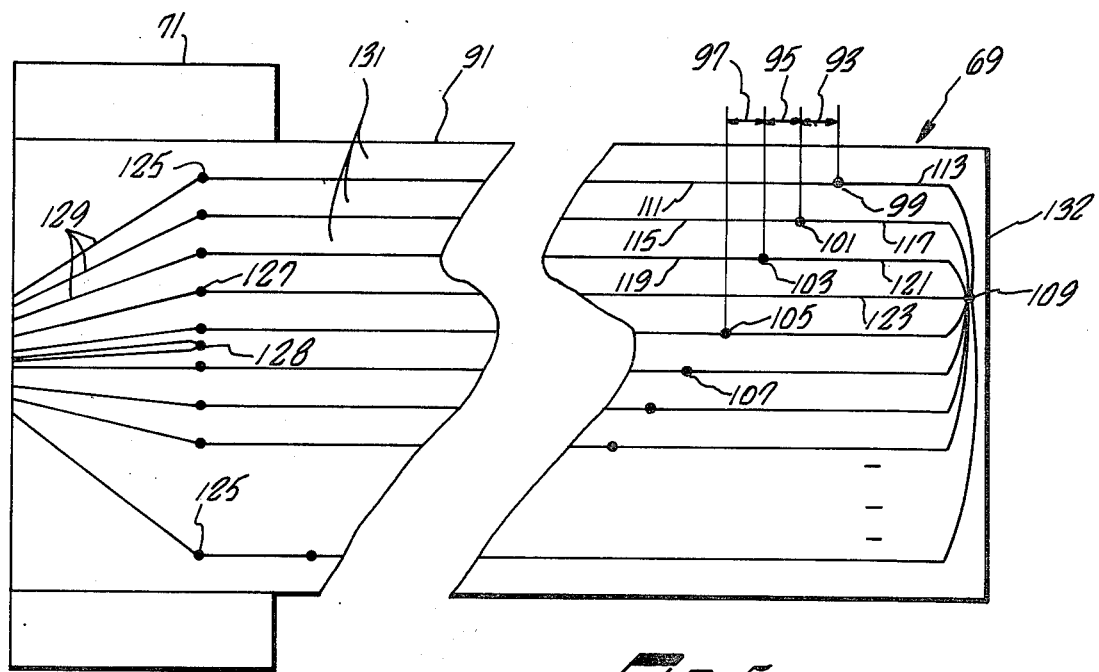
FIG. 5 is a schematic illustration of the temperature probe used in a system of the present invention.

The thermocouple probe 69 of the present invention is uniquely constructed as shown in FIG. 5. The probe has within it a plurality of thermocouple junctions 99, 101, 103, 105, 107, etc. that are preferably spaced at equal distance 93, 95, 97 from each other. Equal spacing along the length of the probe 69 is not mandatory. A non equal spacing may be desired in some applications utilizing a kiln with a special type profile wherein certain areas of the kiln exhibit critical temperature ranges. In such an instance, more thermocouples may be located in that area than in the other less critical areas.

Each thermocouple junction such as junction 99 is made up of an "N" type conductor 111 and a "P" type conductor 113 butt welded together at the junction point 99. Junction 101 has an "N" type conductor 115 and a "P" type conductor 117 butt welded together. Junction 103 has an "N" type conductor 119 and a "P" type conductor 121 welded together. The "N" type and "P" type conductor pairs may be any one of the many metals utilized, which are chosen for the temperature range of the particular kiln or group of kilns to be monitored. Examples of such metal combination pairs are: antimony and bismuth, copper and iron, or copper and constantan, platinum and iridium or alloys of platinum and iridium, rhodium or chromium metal.

The thermocouple probe 69 of the present invention is constructed as shown in FIG. 5 wherein all the "P" type wires 113, 117, 121 are connected to a common point 109 and common point 109 has a common lead 123 connected thereto. The "N" type wires 111, 115, 119 of the respective thermocouple junctions are transmitted to X reference junction points 125 along with the common "P" type lead 123 through high temperature insulation 131 which separates each of the wires. The reference junction points 125 of each of the "N" type wires and the single common "P" type wire 123 is welded to a plurality of respective copper leads 129 which leads are supplied to the multiplexer 75 (FIG. 3).

A compensating thermocouple 128 has its temperature measuring junction located at the reference junction points 125 for the purpose of ascertaining any temperature changes at these junctions and compensating it for those temperature changes.

The probe 69 is made up of a metal sheath 91 of stainless steel or an alloy such as inconel or some other like metal, depending on the temperature range to be monitored. A plug 132 of the same metal is welded to the end to completely enclose the end inserted into the kiln. The other end of the sheath 91 is covered with an Isothermol material 71 which functions to minimize the temperature change in the area of the reference junctions 125. Any changes that do occur will be sensed by reference thermocouple junction 128 and compensated for in a well known manner.

The wires of the various thermocouple junctions are spaciously displaced along the length of the sheath 91 of the probe 69 by a plurality of multiple hole insulators 131 (FIG. 6) that are located within the sheath 91. Each insulator 131 is made up of a high temperature material such as ceramic or compounds of ceramic or a like high temperature material.

Figure 6:
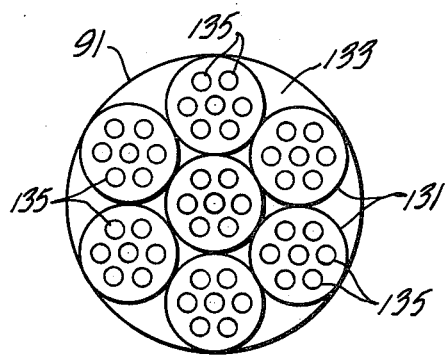
FIG. 6 is an end view cross section of the temperature probe of FIG. 5.

The insulators come in a variety of lengths and are slipped onto the wires in the manner of beads. The complete assembly of multiple hole insulators 131 fits snugly within the sheath 91 of the probe as shown in FIG. 6. The insulators 131 come in a variety of sizes, both in external diameter and in the diameter of the longitudinal holes 135 within them. Thus, it is possible to accommodate a great variety of numbers of thermocouples within a particular probe construction by selecting a particular insulator 131. Although the insulators 131 are tightly packed within the sheet 191, air gaps 133 remain therein. It is preferable that the external diameter of the insulators 131, the size of the multiple holes 135 within each insulator and the diameter of the thermocouple wire located therein be as small as possible if fast response from the thermocouple probe is desired.

Figure 7:
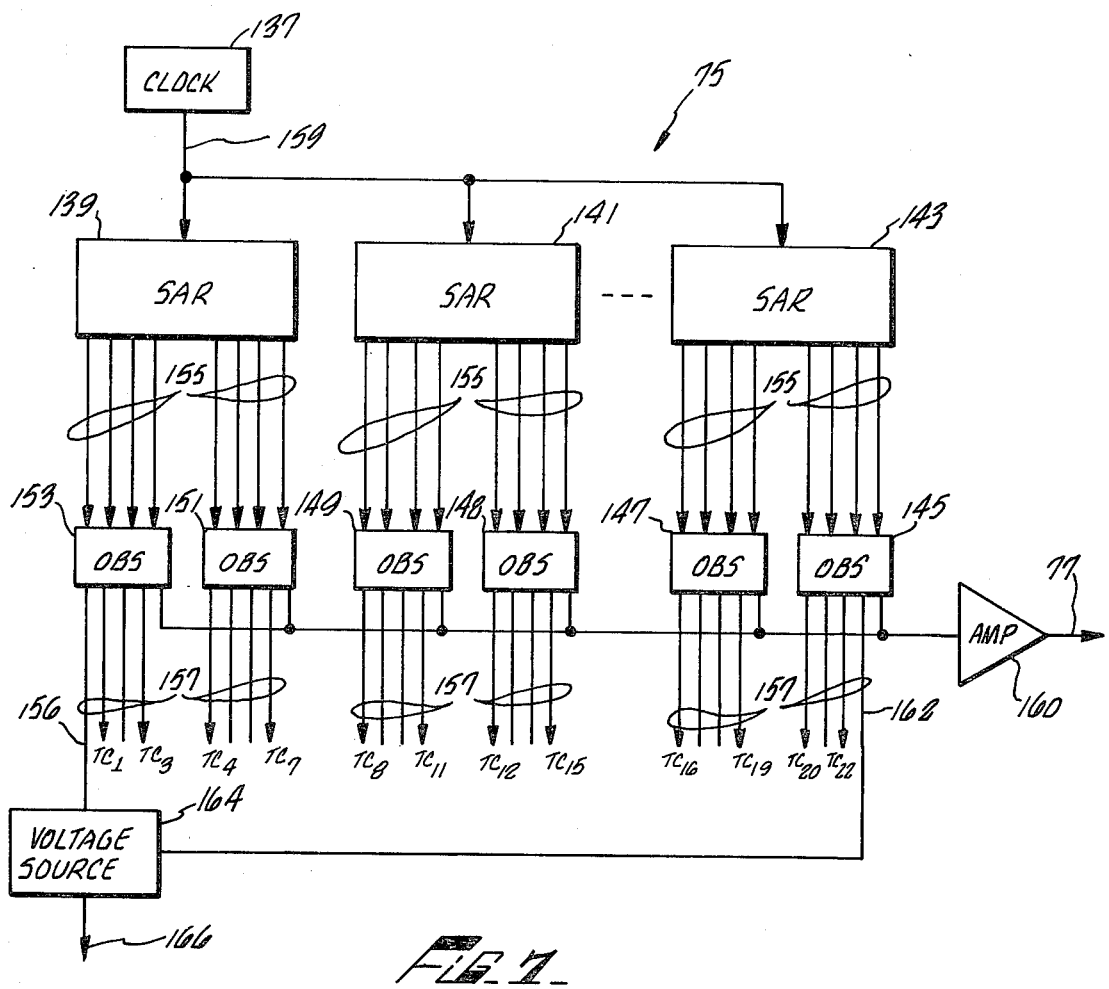
FIG. 7 is a block diagram illustration of the multiplexing control system of the present invention.

FIG. 7 illustrates a preferred embodiment of the multiplexer and amplifier unit 75. A clock source 137 generates a timing signal over line 159 to a plurality of successive approximation registers (SAR) 139, 141, 143 such as manufactured by the Motorola Company for example. These successive approximation registers are shown as having eight output lines 155 per register, which sequentially generates switching signals to a pair of quad-bilateral switches (QBS) 153 such as switch pairs 153, 151, switch pairs 149 and 148 and switch pairs 147 and 145. These bilateral switches are well known as preferred type being manufactured by RCA. Each switch such as switch 153, for example, has four inputs, 157, and four outputs. The output from each of the switches, 153, 151, 149, 148, 147 and 145 are tied together to a single output line 158. Thus, it can be seen that the multiplexer can be expanded to any size desired by simply adding more successive approximation registers and pairs of quad-bilateral switches. The addition of a set of this equipment will increase the multiplexer input by eight channels.

Essentially the thermocouple signal on line TC 1 is sampled first and the thermocouple signal on TC 22 is sampled last for the example of FIG. 7 and then the sequence is repeated. The voltage source 164 is a well known voltage source for supplying a predetermined adjustable voltage to the first and last channel of the multiplexer of FIG. 7, thereby generating the horizontal display line 87 (FIG. 4). The same voltage is supplied to digital thermometer 81 over line 166 to provide a digital temperature reading.

If only one trace is desired, the horizontal sweep signal is triggered once for each sampling cycle of thermocouple 1 through 22 or for thermocouple 1 through N as desired. If multiple displays are desired, then the sweep signal will be triggered twice, three times, so on, within a thermocouple sampling cycle, TC 1 through TC N.

Figure 8:
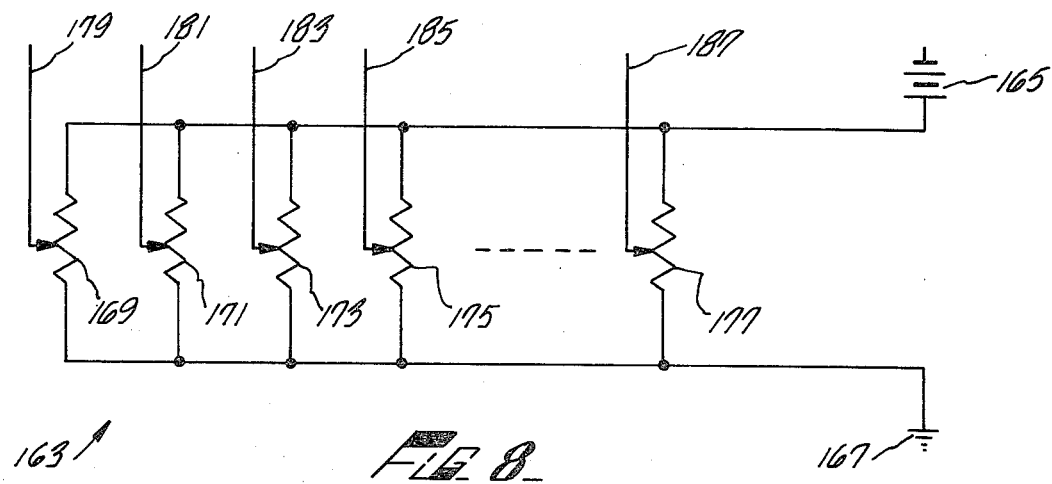
FIG. 8 is a schematic illustration of a profile storing and synthesizing circuit according to the present invention.

Multiple displays are desired when the temperature profile synthesizer 163 of FIG. 8 is utilized to display a preferred standard temperature profile to which it is desired to set the kiln. The synthesizer 163 is comprised of a plurality of variable resistors 169, 171, 173, 175 and 177, one end of the ladder being connected to ground 167 and the other end powered by a DC voltage source 165. In the preferred embodiment, these resistors are manually variable.

By connecting a single resistor network 163 to a series of switches 147, 145, at the same time that thermocouples from a temperature probe are connected to the remaining switches 153, 151, 149, 148, for example, and triggering the sweep of the oscilloscope twice for one scan cycle of all the switches 153 through 145 of the multiplexer 75, a dual trace display is obtained which shows the profile generated by the synthesizer 163 and the profile generated by the kiln itself. If it is desired to store the profile of the kiln, each of the variable resistors 169, 171, 173, 175, 177, etc. of the synthesizer 163 are adjusted so that each of the thermocouple points coincide with the profile generated by the kiln. These resistance settings in combination with the particular voltage generated by the voltage source 165 will reproduce again on the oscilloscope display whenever connected to the quad-bilateral switches of the multiplexer, the particular profile that they represent. The storage of this profile can be made permanent by duplicating the resistances set in a resistance bridge that cannot have their resistance values varied. With a particular desired profile illustrated on the screen of the oscilloscope, the kiln controls may be adjusted on a continuous basis to provide a kiln profile that coincides with a desired synthesized profile.

Figure 9:
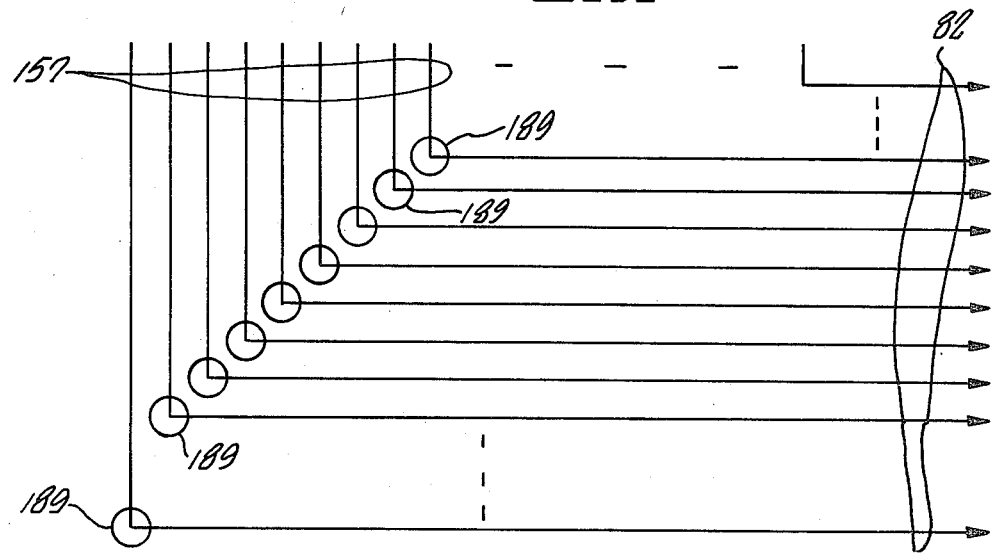
FIG. 9 is a diagrammatic illustration of a switching array according to the present invention.

In an alternate preferred embodiment, in order to obtain a temperature reading for each of the thermocouples displayed on the CRT of the oscilloscope, a switching network, FIG. 9, made up of a plurality of pushbutton switches or other switches 189, are connected at one end to each of the inputs 157 of the quad-bilateral switches of the multiplexer and at the other end to the digital thermometer 81 over cable 82. Thus, the output of any particular thermocouple can be routed to the digital thermometer 81 for a temperature indication. It is desirable to illustrate on a CRT display which dashed line 89 is having its temperature read. Therefore, the intensity of that particular dot can be increased in a well known manner by depression of its respective button out of the array of buttons 189.

Referring now to FIG. 10, an automatic kiln control system utilizing the monitoring capabilities of the present invention as described above is shown. For the sake of simplicity both in the drawings and explanation, it will be assumed that the monitoring system to which the control function of the present invention is attached is an eight channel system comprised of successive approximation registers 141, 143 and their respective quad-bilateral switch pairs 149, 148 and 147, 145. The eight sampling leads to the quad-bilateral switch pair 148, 149, that is the four leads in cables 243 and the four leads in cables 245, will be connected to a resistance-ladder network temperature profile synthesizer of the type shown in FIG. 8. The eight leads of cables 247, 249 of the switches 147 and 145, will be connected to an eight thermocouple probe such as shown in FIG. 5.

With the ladder network and the probe connected, two displays will be generated on the CRT screen as explained above, the signals from both sources being sequentially supplied through amplifier 160 to the Y deflection plates of the CRT screen. The two displays will be preferred or desired synthesized temperature profile along with the actual profile of the kiln.

The automatic control function is accomplished by continually adjusting the heating parameters of the kiln to create a temperature profile that coincides with the preferred synthesized temperature profile. It should be understood that this control function can be accomplished without displaying either the synthesized profile or the actual profile on the CRT screen.

Each of the eight sensing thermocouples in the kiln are scanned and their signals are sampled by way of the leads in cables 247 and 249 through switches 147, 145 respectively, under the control of the output signals of the successive approximation register 143. Quad-bilateral switches 197 and 203 are actuated in synchronism with switches 145, 147 to successively scan the signals generated on cables 243 and 245 connected to a synthesizer ladder network (not shown). As a result, the output signals on line 158 from the quad-bilateral switch pair 145, 147 is compared with the output signals on line 207 from quad-bilateral switches 203, 197. At each sampling instant, therefore, an actual thermocouple reading on line 158 is compared with a synthesized thermocouple reading on line 207 by comparator amplifier 205.

As a result of this comparison, comparator amplifier 205 generates a control signal on line 215. This control signal is supplied to the inputs of quad-bilateral switches 199 and 201 each time it is generated. Both switches 199 and 201 are activated synchronously with switch pairs 197, 203 and 145, 147, thereby causing the input signal on line 215 to be routed to one of the lines on cable 211 of switch 201 or cable 213 of switch 199, dpeending on which particular thermocouple is being sampled at that instant of time.

The control signals routed by the quad-bilateral switches 199, 201 are supplied to a plurality of transistor switches 217, 219, 221, 223, 225, 227, which are connected in series with a heater element between a voltage source 241 and ground. Thus, assuming a control signal is supplied to transistor switch 217, it will turn transistor switch 217 on creating a current flow through heating element 233 through the transistor to ground from the voltage source 241. As soon as the quad-bilateral switch router 201 supplies switches to another control line, the RC network 216 of transistor 217 will cause that transistor to remain on until the next cycle when the line going to transistor switch 217 is again connected to the output signal on line 215 of comparator amplifier 205.

It should be noted that although the quad-bilateral switches 201 and 199 have a four channel capability, only three output channels are utilized. Thus one output channel may be provided with a control signal twice during one cycle if desired. Or, one of the channels may simply be bipassed, thereby also eliminating the respective control input line on cables 195 and 193. Heater elements 229, 231, 233, 235, 237 and 239 may be the main heating elements of the kiln or supplemental fine tuning heater elements inserted into the kiln to operate with the main heating elements. The heating elements may also be replaced with relays or solonoid valves which indirectly control the heat input to a controlled zone.

What has been described is a means and method for comparing the temperature at any given point in a kiln with any other given point; a means and method for continuously monitoring and displaying the temperature profile of a kiln; a means and method of displaying a synthesized temperature profile; a means and method for generating a synthesized temperature profile; and a means and method for controlling the temperature profile of a kiln.

It should be understood, of course, that the foregoing disclosure relates to only preferred embodiments of the invention in that modifications may be made therein without departing from the spirit and scope of the invention. Thus, for example, although only thermocouples have been discussed in connection with the preferred embodiments, it is possible to incorporate RTD's, thermistors and other sensors in a manner similar described here for thermocouples. The system and method of monitoring the temperature and controlling the temperature profile of a kiln may have equal application to other than temperature control situation such as, for example, cooling systems and structural strain analysis.

What is claimed is:

1. A system for obtaining the temperature profile of a kiln, comprising:
   a temperature probe having a protective metallic sheath, a plurality of thermocouple temperature measuring junctions located in said sheath, each thermocouple being end connected, disposed along the length of the sheath at spaced intervals, all the wire leads of one type from each thermocouple junction being connected together to a single common lead, high temperature insulation surrounding each thermocouple junction and the wire leading thereto and a plurality of intermediate reference junctions, one for each of said temperature measuring junctions and one for the common lead located at one end of said sheath;
   multiplexing means receiving the individual signals from each thermocouple junction in said temperature probe for sequentially sampling each signal for a finite period of time; and
   display means receiving the sampled signals from said multiplexing means for displaying the received signal samples as an indication of the temperature relationship between the received signal samples.

2. The system of claim 1 further comprising an instumentation amplifier connected to the output of said multiplexing means for receiving and amplifying the sampled time-multiplexed signals and supplying them to said display means.

3. The system of claim 1 further comprising voltage generating means for supplying a predetermined variable voltage to said display means, said display means displaying a line representative of said predetermined variable voltage.

4. The system of claim 3 further comprising a voltage responsive temperature indication means for receiving the voltage from said voltage generating means and indicating a temperature in response thereto.

5. The system of claim 1 further comprising means for generating an array of voltages, said voltages being supplied to said display means for displaying a desired temperature profile at the same time the received signal samples from the temperature sensing array is being displayed.

6. The system of claim 5 wherein said voltage array generating means comprise:
   a resistor ladder network, each resistor therein generating a voltage; and
   a voltage source connected to one end of the ladder network.

7. A method for obtaining the temperature profile of a kiln, comprising:
   continually sensing the temperature in a multiplicity of areas in the kiln;
   generating a voltage signal representative of the temperature being sensed in each area of the kiln;
   sequentially time sampling the generated voltages;
   supplying the time sampled voltages to a display device;
   displaying the sampled voltages as an indication of the temperature relationship between them;
   indicating the temperature of a particular area in the kiln being sensed upon the depression of a button for that area; and
   displaying the particular sampled voltage having its temperature indicated at an intensity different from that of the other sampled voltages.

8. The method of claim 7 further comprising:
   generating a voltage signal representative of a predetermined temperature;
   supplying the voltage signal to said display device; and
   displaying the voltage signal as a line on the display device.

9. The method of claim 7 further comprising:
   generating an array of voltages representative of individual sensed temperatures;
   supplying said array of voltages sequentially to said display means; and
   displaying the array of voltages as an indication of the temperature relationship between them at the same time that the sampled voltages are displayed.

10. The method of claim 7 further comprising:
    connecting a ladder network of variable resistors driven by a voltage source to said display device while the kiln temperature representative sampled voltages are being displayed thereon;
    displaying the voltages generated by each of the variable resistors in the ladder network; and
    adjusting each variable resistor in the ladder network until the sampled voltage display coincides with the display generated by the voltages from the resistors in the ladder network.

11. A temperature probe for use in a system for obtaining the temperature profile of a kiln, comprising:
    a protective metallic sheath of a certain diameter;
    a plurality of thermocouple temperature-measuring junctions located in said sheath, each thermocouple being end connected, disposed along its length at spaced intervals, all the wire leads of one type from each junction being connected together to a single common lead;
    high temperature insulation surrounding each thermocouple junction and the wires leading thereto; and a plurality of intermediate reference junctions, one for each of said temperature measuring junctions and one for the common lead located at one end of said sheath.

12. The temperature probe of claim 11 further comprising
a sleeve of isothermal material surrounding the sheath and overlaying the plurality of intermediate junctions.

13. The temperature probe of claim 11 further comprising a temperature measuring thermocouple junction located at the reference junction for measuring any temperature change occurring thereto.

14. A system for obtaining the temperature profile of a kiln, comprising:
a unitary array of temperature sensing means inserted into said kiln for sensing the temperature in the vicinity of each individual sensing means in the array;
first multiplexing means receiving the individual signals from each temperature sensing means in said array for sequentially sampling each signal for a finite period of time;
means for generating an array of signals representative of a desired temperature profile;
second multiplexing means receiving the voltages from said generating means for sequentially sampling each signal for a finite period of time in synchronism with said first multiplexing means; and
means for comparing each sampled signal from the first multiplexing means with the corresponding signal from the second multiplexing means, and generating a control signal in response thereto.

15. The system of claim 14 further comprising means for receiving the control signals from said comparing means and routing them to their respective controlled elements.

16. The system of claim 15 wherein said controlled elements comprises:
transistor switch means actuated on or off by said control signals; and
a heating element connected in series with said switch means.

17. The system of claim 16 further comprising an R.C. network connected to the input control lead of said transistor switch means whereby an on control signal will be maintained at the input control lead of said switch for a finite period of time after it is no longer being supplied by said routing means.

18. A system for controlling the occurrence of physical phenomena in a distributed defined area, comprising:
an array of sensing means placed in the distributed defined area, each sensing means sensing the occurrence of a physical phenomena;
first multiplexing means receiving individual signals from said array of sensing means for sequentially sampling each signal for a finite period of time;
means for generating an array of signals representative of a desired distribution of physical phenomena occurrence;
second multiplexing means receiving the signals from said generating means for sequentially sampling each signal for a finite period of time in synchronism with said first multiplexing means; and
means for comparing each sampled signal from the first multiplexing means with the corresponding signal from the second multiplexing means and generating a control signal in response thereto.

* * * * *